United States Patent
Martin et al.

(10) Patent No.: US 7,288,691 B2
(45) Date of Patent: Oct. 30, 2007

(54) PROCESS FOR HEAT TREATMENT OF HYDROCARBON FEEDSTOCKS BY FURNACE THAT IS EQUIPPED WITH RADIANT BURNERS

(75) Inventors: Gérard Martin, Saint Genis Laval (FR); Luc Nougier, Sainte Foy les Lyon (FR); Etienne Lebas, Vienne (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 639 days.

(21) Appl. No.: 10/764,584

(22) Filed: Jan. 27, 2004

(65) Prior Publication Data

US 2004/0186336 A1    Sep. 23, 2004

(30) Foreign Application Priority Data

Jan. 27, 2003    (FR)    .................................... 03 00944

(51) Int. Cl.
*C07C 4/02*    (2006.01)
(52) U.S. Cl. ....................................... 585/652; 585/648
(58) Field of Classification Search ................ 585/652, 585/648; 423/418.2, 651
See application file for complete search history.

(56) References Cited

U.S. PATENT DOCUMENTS 2,908,631 A    10/1959    Allen
3,216,478 A    11/1965    Saunders et al.
3,475,135 A *  10/1969    Gargominy ................. 422/197
3,487,121 A *  12/1969    Hallee ......................... 585/652
3,857,668 A    12/1974    Koch
4,658,762 A *   4/1987    Kendall .................. 122/250 R

FOREIGN PATENT DOCUMENTS

EP    0 284 004 A1    9/1988
FR    1 581 770       9/1969

OTHER PUBLICATIONS

Patent Abstracts of Japan, vol. 010, No. 122 (M-476), May 7, 1986—& JP 60 251315 A (Babcock Hitachi KK), Dec. 12, 1985.

* cited by examiner

*Primary Examiner*—Thuan Dinh Dang
(74) *Attorney, Agent, or Firm*—Millen, White, Zelano & Branigan, P.C.

(57) ABSTRACT

The invention consists of an application of radiant burners to furnaces for heat treatment of hydrocarbon feedstocks in which the feedstock that is to be treated circulates inside an exchange tube bundle that receives the heat that is emitted by the burners essentially by radiation and for which a strict monitoring of the temperature profile along the exchange bundle is necessary. Applied to steam-cracking furnaces, the invention makes it possible to increase the propylene yield to iso ethylene yield. It also makes it possible to increase the compactness of the furnace and the longevity of the exchange bundle and to reduce the NOx emissions.

20 Claims, 4 Drawing Sheets

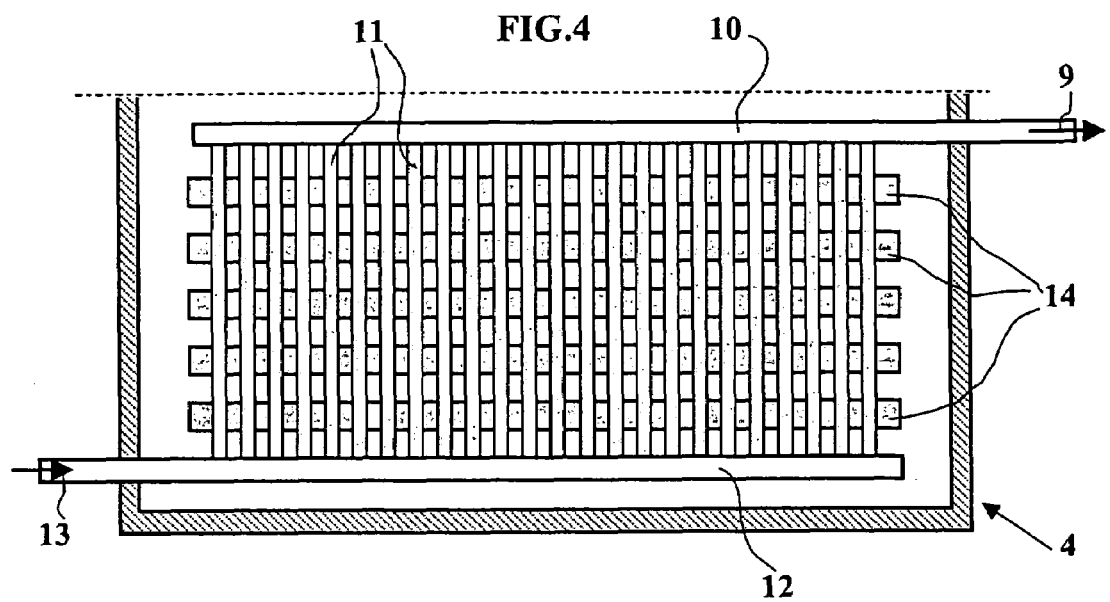
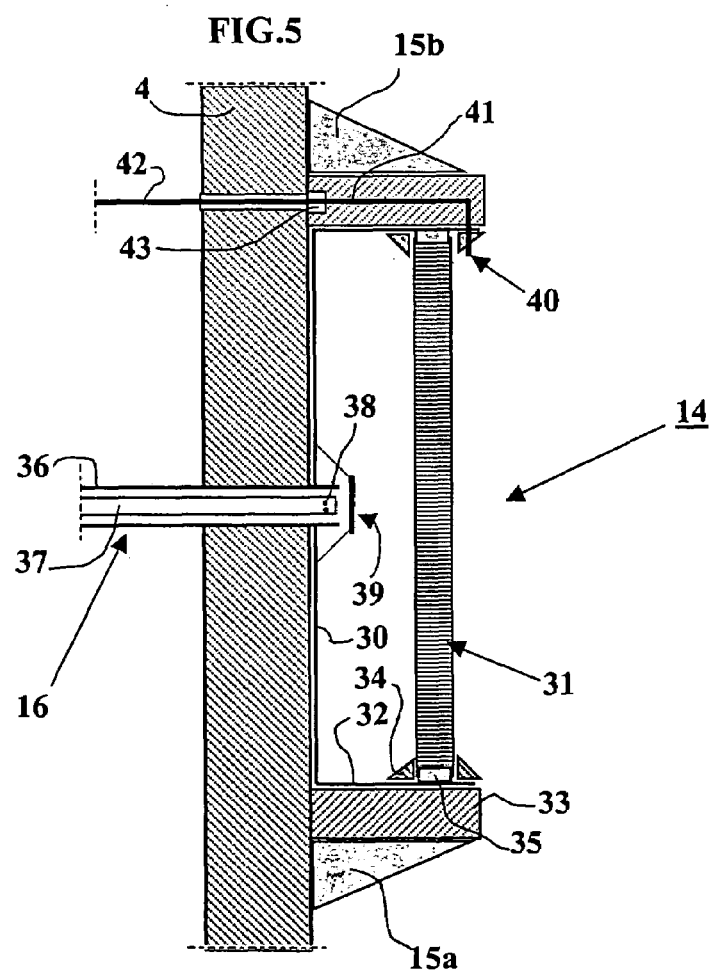

PROCESS FOR HEAT TREATMENT OF HYDROCARBON FEEDSTOCKS BY FURNACE THAT IS EQUIPPED WITH RADIANT BURNERS

This invention is placed within the context of the furnaces for heat treatment of hydrocarbon feedstocks, such as those that are used in the production of ethylene, or higher olefins, from various fractions that can go from ethane to gas oil, but most often making use of feedstocks that are called naphtha whose boiling points extend from about 40 to 200° C. These furnaces are called steam-cracking furnaces. The invention can also be used in steamreforming furnaces such as those that are used for the production of synthesis gas from various hydrocarbon fractions that generally go from methane to naphtha. Finally, it can be used in dehydrogenations of paraffin fractions such as the C3 or C4 fraction, for which the monitoring of the temperature within narrow limits is absolutely necessary.

More generally, the invention relates to any type of furnace in which the heat that is emitted by burners is transferred essentially by radiation to an exchange tube bundle inside of which circulates the hydrocarbon feedstock that is to be treated, and for which a strict monitoring of the temperature profile should be exerted throughout the exchange bundle. In the text below, essentially a steam-cracking furnace will be mentioned as an illustration of the application possibilities of this invention, but its field of application is in fact broader.

The structure of the steam-cracking furnaces can be described in the following manner in reference to FIG. 1.

These furnaces are generally constructed as groups of several functional units, generally two, that share chimney (26) and certain structural elements. Each functional unit comprises an upper convection section (2) and a lower radiation section (1). The radiation section contains several radiation beams in parallel (11), generally vertical, and each having the same geometric definition or very closely related geometric definitions. Each of the passages defined by a complete element of the beam is called a "pass." A beam is therefore a group of n identical passes that operate in parallel.

Generally, the parallel beams, also called "passes," are paired by groups of two at the end of the radiation zone so as to simplify the design of the line that connects the outlet end of the bundle's tubes to an external exchanger in furnace (24), intended to ensure a quick cooling of the effluents.

Convection zone (2), located above radiation zone (1) in the direction of flow of the smoke, contains a certain number of convection bundles such as (25) that recovers the considerable heat contained in the smoke i.e. flue gas. These bundles are dedicated to preheating the feedstock and the water vapor used for the dilution of the feedstock. The connection between the outlet of the convection bundle that is intended for the preheating of the feedstock and the inlet in the radiation beams is ensured by a pipe that is not shown in FIG. 1 and that generally comprises a horizontal portion that is located at the base of the radiation zone that receives at its inlet end the preheated feedstock and that distributes said feedstock along a number of identical vertical tubes, whereby each set of parallel vertical tubes forms the radiation beam.

A radiation beam such as (11) therefore comes in the form of a certain number of generally vertical tubular pins that are connected by elbows and essentially located in the center of the radiation zone. These pins are suspended at the top by means of hooks that traverse the upper portion of the radiation zone. In some furnaces, the radiation beam simply consists of identical vertical tubes that operate in parallel either from bottom to top or from top to bottom according to the flow of fluids inside the tubes.

Radiation beam (11) is heated by means of flame burners that are placed either on horizontal wall (27) of the furnace or on vertical walls (4). The arrangement of these flame burners along the walls varies according to the manufacturers, but this arrangement is generally selected to ensure the most homogeneous thermal flow possible along the heat-radiating bundle.

The diameter of the tubes that constitute the bundle can be constant throughout the bundle or else gradually increase from the inlet to the outlet of fluids to take into account the volumetric increase of cracking products relative to the feedstock.

Often, the passage to a larger tube diameter (in the direction of flow of the fluids inside the tubes) is related to a reduction of the number of passes. For example, a beam that begins with 4 passes in parallel can be reduced to 2 passes after the first vertical passage downward or upward, whereby each pass has a diameter that is larger than that of the 4 initial passes, whereby the two passes are themselves reduced to a single pass at the outlet of the radiation zone.

Frequently, the radiation beam tubes are made of a special steel alloy with about 25% chromium and 20% nickel.

The tubes are typically manufactured such that the inside wall of the tubes has a very slight roughness that makes it possible to reduce the surface carburation levels. The operating temperatures of these tubes (skin temperatures) are generally around 1050° C., and their service life can range up to 4 years and more. The rupture of the tubes is very generally linked to the surface carburation phenomenon.

More recently, alloys with a higher nickel content, typically up to 35% Ni and even more, made it possible to reach temperatures from 1100° C. to 1150° C., which is then reflected by a reduction in dwell time or by superior treatment capacities.

The combustion chamber is generally equipped with a number of, often approximately one hundred, forced-air burners or blown-air burners. According to the technologies that are proposed by the licensors, these burners are either bottom burners or front burners. In all of the cases, the flames that are obtained from these burners are calculated so as to avoid the direct impact of flames on the radiation tube bundle.

When the burners are front burners, certain technology lessors propose equipment that generates a flame with a very wide aperture angle, greater than 90°, such that a major portion of the front is covered by flames. Other types of burners use flames that are emitted radially, essentially parallel to the radiant walls of the furnace. In general, it is desired that the flames sweep the radiant walls as much as possible and do not come close to the bundle's tubes. The portion that is occupied by the burners themselves on the fronts is reduced; these are the flames that cover a significant portion of the front walls, made of refractory materials, which transfer a portion of their energy in radiant form directly to the bundle's tubes and another portion indirectly via the radiant walls. Typically, ratio R of front burner surfaces/front radiant walls: R=cumulative surface area of the burners to the radiant walls/total surface area of the radiant walls is very low, less than 0.2 and generally less than 0.1.

The burners are generally fed by "diesel fuel," i.e., a gas by-product, by the heat treatment of hydrocarbon feedstocks or simultaneously by the "diesel fuel" and liquid fuels such as fuel, and even naphtha or gas oil.

The gas oil that is used as a fuel should often have specifications of low content in mineral materials (less than 100 ppm), low sulfur content (less than 1.0%) and a limited content of heavy metals such as vanadium (less than 5 ppm).

The technology of radiant burners consists in carrying out the combustion of a gaseous fuel or pre-vaporized fuel on the surface of a porous metal environment or porous ceramic environment ("blue flame" mode operation will then be mentioned) or directly inside of said porous environment ("radiant" mode operation will then be mentioned).

In the latter case, the heat that is produced inside the porous environment is first transferred to the outside surface of the porous environment (the surface that sees the tube bundle) by conduction, then emitted by radiation to the bundle of tubes to be heated. This technology appeared several years ago in applications of drying furnaces or furnaces for an automobile painting booth, applications for which the most uniform heat flow possible is desired.

In the case of steam-cracking furnaces, it is known that the flames have large temperature gradients within, gradients that are very difficult to estimate and to monitor, because they depend on numerous factors such as the conditions of introducing the fuel and the oxygen carrier, the nature of the fuel, the geometry of the furnace, and the greater or lesser proximity of the other burners.

Often associated with these temperature gradients are thermal flows that are more or less non-homogeneic, which can lead to local overheating of the tubes; said overheating entrains an increased coking and a carburation of said tubes. It is known, for example, that a refractory steel tube of HK 40 type has a resistance to the rupture that is strongly dependent on the temperature.

In the text below, the radiant burner is called a combustion system of an air-fuel mixture that is characterized by the presence, downstream from the introduction of said fuel mixture in a supply chamber, of a porous panel whose inside face communicates with the supply chamber and the outside face, i.e., the one that "sees" the heat-radiating exchange beam, transfers its heat essentially by radiation.

The supply chamber supplies to the combustible mixture the porous element within which is carried out the combustion that may take place either in "radiant" mode, or in "blue flame" mode, according to the specific power developed that can be expressed in kW/m$^2$ of said panel.

In "radiant" mode, the fuel is oxidized essentially completely in the porous environment, and the heat that is produced is transferred by conduction to the inside of the porous environment, then emitted by outside surface radiation (or downstream relative to the direction of flow of the combustion gases) of said porous environment.

In "blue flame" mode, the combustion takes place essentially on the outside surface of the porous environment or at a short distance from this porous environment. For fuels such as natural gas, the "radiant" mode operation intervenes typically for specific powers of between 100 and 500 kW/m$^2$, relative to the surface of the panel in the porous environment, while beyond 500 kW/m$^2$, a "blue flame" mode is found. It is possible to move the limit that separates the "radiant" mode from the "blue flame" mode if all or part of the porous environment is impregnated with a substance that catalyzes the combustion reactions.

The "radiant" mode makes it possible to have very low emission levels of NOx, CO and unburned materials. Actually, in this modification, and particularly when the porous environment contains a catalytic substance, the combustion temperature is very considerably reduced relative to that which it would be in a traditional combustion. There therefore results a very clear reduction of the NOx emissions.

Japanese Patent 60-251315 describes a heating furnace that is equipped with so-called catalytic burners.

Said burners are equipped with a radiant heating plate on their front face (i.e., the face that is the closest to the tube bundle). These so-called catalytic burners are placed in a large number of stages on the lateral walls of the furnace. In addition, the figures that are attached to Patent 60-251315 make a catalytic module clearly appear upstream from the radiant plate, inside of which module is carried out a first portion of the combustion. Upstream from this catalytic module, there is a flame shield. The heating plate has the effect of producing a shortened flame of "blue flame" type, while the role of the catalytic element that is placed upstream is to initiate the combustion and thus to ensure the stability of the combustion thanks to keeping the heating plate at a temperature that is typically between 300 and 500° C.

These burners are therefore not suitable for steam-cracking furnaces or for vaporeforming furnaces, for which the temperatures of the radiant walls should be between 900° C. and 1300° C.

The NOx emissions in the furnaces equipped with burners that treat "diesel fuel" or light liquid fractions such as gas oil result primarily from the oxidation of the nitrogen of the oxygen carrier. "Thermal" NO is then mentioned, and the primary parameter that governs its formation is the temperature, with concentration levels in the smoke that typically exceed 100 mg/Nm$^3$, starting from 1500° C. To avoid the formation of NOx, it is therefore important that the flame temperatures be the lowest possible.

Patent 60-251315 refers to a smoke recirculation system, which, by a dilution effect, makes it possible to significantly reduce the flame temperature. This technique, however, is difficult to use. It requires large pipes for bringing the smoke from the outlet of the furnace toward the combustion equipment. It can also lead to the formation of unburned materials.

PRESENTATION OF THE FIGURES

FIG. 4 represents the same furnace according to the invention in front view.

FIG. 5 represents a radiant burner that equips the furnace according to the invention.

SUMMARY DESCRIPTION OF THE INVENTION

Figure 1:
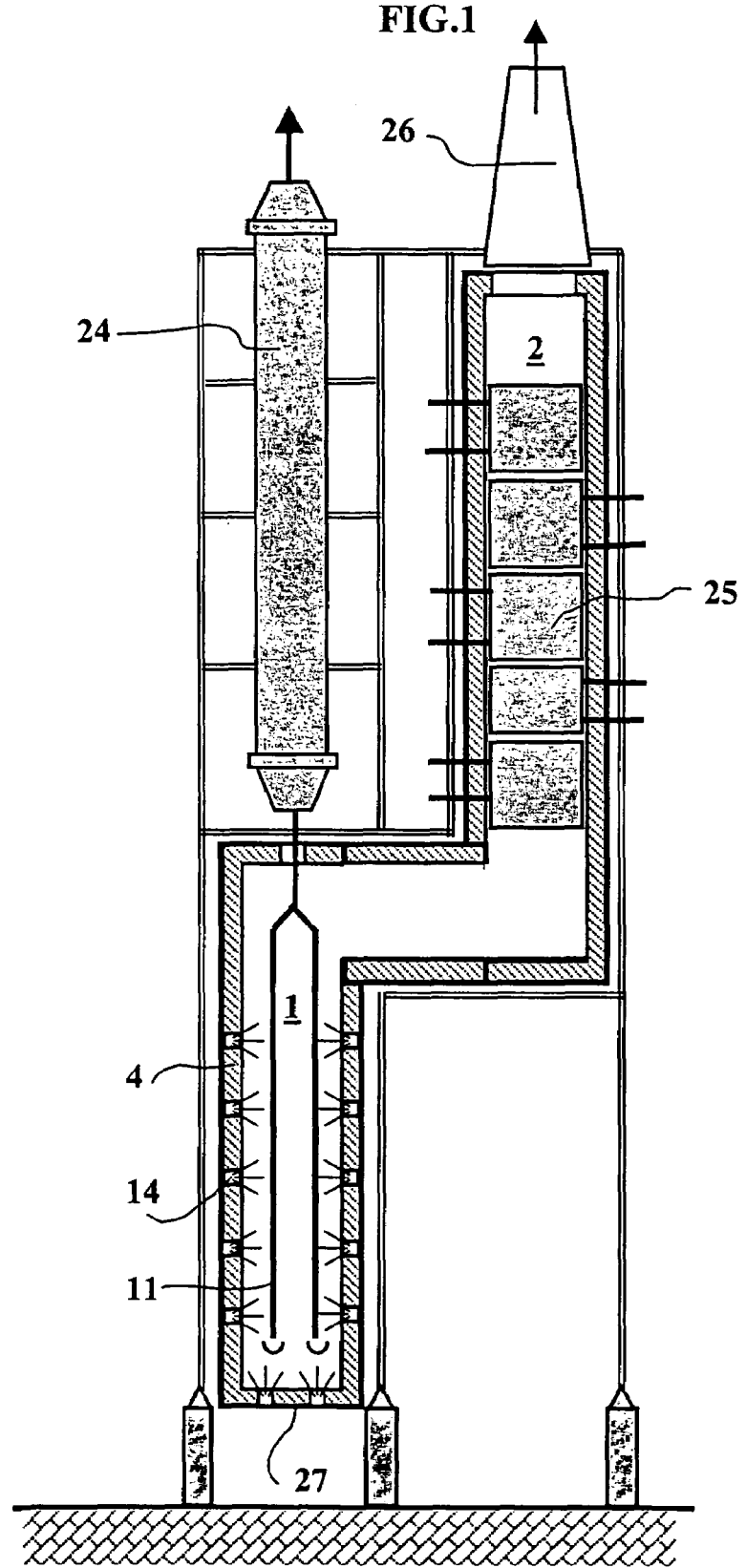
FIG. 1 represents a typical view of a steam-cracking furnace that is equipped with flame burners according to the state of the art.

One of the objects of the invention is to eliminate the drawbacks of the prior art. The invention consists in using the technology of radiant burners and more particularly the technology of catalytic radiant burners, in furnaces with radiant walls, such as the furnaces for steam-cracking or steam reforming hydrocarbons, where the heating intensities can lie between 50 and 500 kW/m$_2$, and even more, whereby the surface is that of the radiant pore panels, within the scope of mean temperatures of radiant walls of between 900° C. and 1300° C.

The invention makes it possible to resolve one of the major problems that is linked to the technology of traditional furnaces, that of monitoring the temperature along the tube bundle. The control of the temperature profile will make it possible to avoid hot points on the tubes and therefore premature coking and carburation of the tubes. The longevity of the tubes thus will be increased, as well as the rate of availability of the furnace.

The invention will also make it possible to improve the selectivity of the cracking reactions based on the desired product distribution. It will also make the decoking operations less delicate to conduct.

The invention also makes it possible to respond to increasingly strict standards on NOx emissions, which in some cases can be as low as 10 mg/Nm$^3$, thanks to the possibility of operating in "radiant" mode, even with high thermal flows. The use of radiant burners according to the invention thus avoids having recourse to heavy strategies for reducing the NOx such as recycling smoke, or the addition of SCR (Selective Catalytic Reduction)-type smoke treatment systems downstream from the furnace.

Finally, the invention makes it possible to produce more compact furnaces and therefore to reduce investment.

The invention therefore consists of a process for heat treatment of hydrocarbon feedstocks that relies on a furnace that has at least one radiation chamber that contains at least one essentially vertical exchange tube bundle, inside of which circulates the hydrocarbon feedstock that is to be treated, whereby said furnace is equipped on at least one portion of its lateral walls with catalytic radiant burners, placed in the form of horizontal bands that are distributed over several vertical levels, characterized in that the heating power is varied along each horizontal band so as to impose a determined temperature profile on the exchange tube bundle placed in the radiation chamber of the furnace.

It is suitable to emphasize that the principle of the modulation of the heating power is, in fact, very difficult to carry out in a traditional furnace that is equipped with flame burners. Actually, if the furnace consists of a single radiation chamber, which is the very large majority of cases, the modulation of the heating power by row of burners will produce only a marginal effect because of the large size of said chamber which will be reflected by a homogenization of temperatures within the chamber because of heat-radiating exchanges.

The only way of effectively carrying out a controlled variation of the temperature along the exchange bundle in the case of a traditional furnace that is equipped with flame burners is to subdivide the radiation chamber into several sub-chambers that are placed in a series, each chamber keeping a homogeneity of temperature. The very great advantage of this invention consists specifically in making possible an effective monitoring of the temperature profile along the exchange bundle in the radiation chamber being considered. This does not absolutely preclude using a certain number of such chambers in parallel to be replaced within the scope of a traditional architecture of the furnace as described in the prior art.

According to a characteristic of the process, each radiant burner consists of a parallelepipedic box that has one of its faces placed against one of the lateral walls of the furnace and the face opposite to said face, consisting of a porous panel whose inside face communicates with the fuel supply chamber, and the heat-radiating outside face transfers its heat to the tube bundle essentially by radiation.

According to another characteristic of the process, the combustion of the air-fuel mixture that is used to supply the catalytic radiant burners takes place in a catalytic zone that is located inside the porous panel, according to a so-called "radiant" combustion mode, i.e., the heat that is emitted by the catalytic combustion is transferred to the outside face of the porous panel by conduction, then to the tube bundle essentially by radiation.

According to another characteristic of the process, the combustion of the air-fuel mixture that is used to supply catalytic radiant burners can in some cases take place on the outside surface of the porous panels according to a so-called "blue flame" method.

According to another characteristic of the process, the gaseous or prevaporized fuel is introduced inside the supply chamber by a cylindrical pipe that is essentially perpendicular to the lateral wall of the furnace, whereby the combustion air is introduced via an annular pipe that surrounds the cylindrical intake pipe of the fuel. The mixture of air and the gaseous or prevaporized fuel takes place just downstream from the outlet of their intake pipe respective to the inside of the supply chamber, and this mixture can be enhanced by an obstacle that is located inside the supply chamber close to the outlet end of said intake pipes.

According to a preferred characteristic of the process, it is possible to use on the level of each radiant burner the so-called "radiant" combustion mode, in the meaning defined above, in a heat flow range that goes from 10 to 600 kW/m*2, and preferably from 100 to 400 kW/m*2.

In the case of an operation of the burner in a blue flame mode, it is possible to use heat flows in the range of 100 to 1000 kW/m*2, and preferably in the range of 500 to 900 kW/m*2.

The distance between the outside surface of the radiant panels and the tubes of the exchange bundle located in the radiation chamber of the furnace can be reduced in a range of 25 to 80% and preferably 40 to 70%, relative to the distance that it would be necessary to respect in a furnace that uses the same bundle and traditional flame burners.

The invention relates in particular to a process for heat treatment of a hydrocarbon feedstock in a furnace that comprises at least one radiation chamber with radiant walls, comprising at least one essentially vertical exchange tube bundle inside of which circulates the hydrocarbon feedstock to be treated, whereby said radiant walls are equipped with catalytic radiant burners with porous panels that are typically used in the form of essentially horizontal or optionally vertical bands, distributed over several levels in the vertical direction, or respectively in the horizontal direction, whereby these catalytic burners generate a mean temperature Tm of the radiant walls of between 900° C. and 1300° C., characterized in that ratio R of the cumulative surface of the porous panels to the cumulative surface of the radiant walls is at least equal to 0.3 and in that this ratio R is high enough and mean temperature Tm is low enough so that the NOx level in the smoke at the outlet of the furnace is at most equal to 100 mg/NM$^3$.

Typically, ratio R of the cumulative surface of the porous panels to the cumulative surface of the radiant walls is at least equal to 0.3, and this ratio R is high enough and mean temperature Tm is low enough so that the NOx level in the smoke at the outlet of the furnace is at most equal to 10 mg/NM$^3$.

Tm is often between 950° C. and 1250° C., preferably between 1000° C. and 1200° C., and R is between 0.5 and 1, and preferably between 0.7 and 0.95.

The invention therefore proposes radiant walls of which the largest portion of the surface consists of the porous surfaces of the catalytic burners. It was noted that the latter made it possible to reduce the mean temperature of the radiant panels of burners whose surface is greatly extended and to greatly lower the production of NOx.

Generally, each radiant burner consists of a parallelepipedic box that has one of its faces placed against the lateral walls of the furnace, whereby the face that is opposite to the preceding one consists of a porous panel whose inside face communicates with a fuel supply chamber, and the heat-radiating outside face transfers its heat to the tube bundle essentially by radiation.

Most often, the porous panel exhibits a porosity of between about 0.1 and 0.95, preferably between 0.3 and 0.8.

Typically, the combustion of the air-fuel mixture that is used to supply catalytic radiant burners takes place in a catalytic zone that is located inside the porous panel, according to a so-called "radiant" combustion mode.

The combustion of the air-fuel mixture that is used in the supply of catalytic radiant burners can take place on the outside surface of the porous panel according to a so-called "blue flame" mode.

Typically, and preferably, the combustion of the air-fuel mixture that is used in the supply of catalytic radiant burners takes place in a catalytic zone that is located inside the porous panel according to the so-called "radiant" combustion mode.

Generally, at each catalytic radiant burner, the so-called "radiant" combustion mode is used in a heat flow range from 10 to 600 kW/m*2, preferably 100 to 400 W/m*2 and very preferably between 100 to 300 kW/m*2.

The process according to the invention can be a process for steam-cracking hydrocarbons for the production of ethylene and propylene.

It can also be a process for steam-cracking hydrocarbons that have essentially fewer than 12 carbon atoms for the production of synthesis gas.

In this case, the exchange bundle is, at least in part, filled by catalyst. More generally, the invention can be applied to any type of furnace in which the monitoring of the temperature profile along the exchange bundle is essential from the reaction standpoint.

DETAILED DESCRIPTION OF THE INVENTION

The detailed description of the invention will be done for the application to steam-cracking furnaces, according to the best implementation, by means of FIGS. 2, 3, 4 and 5.

Figure 2:
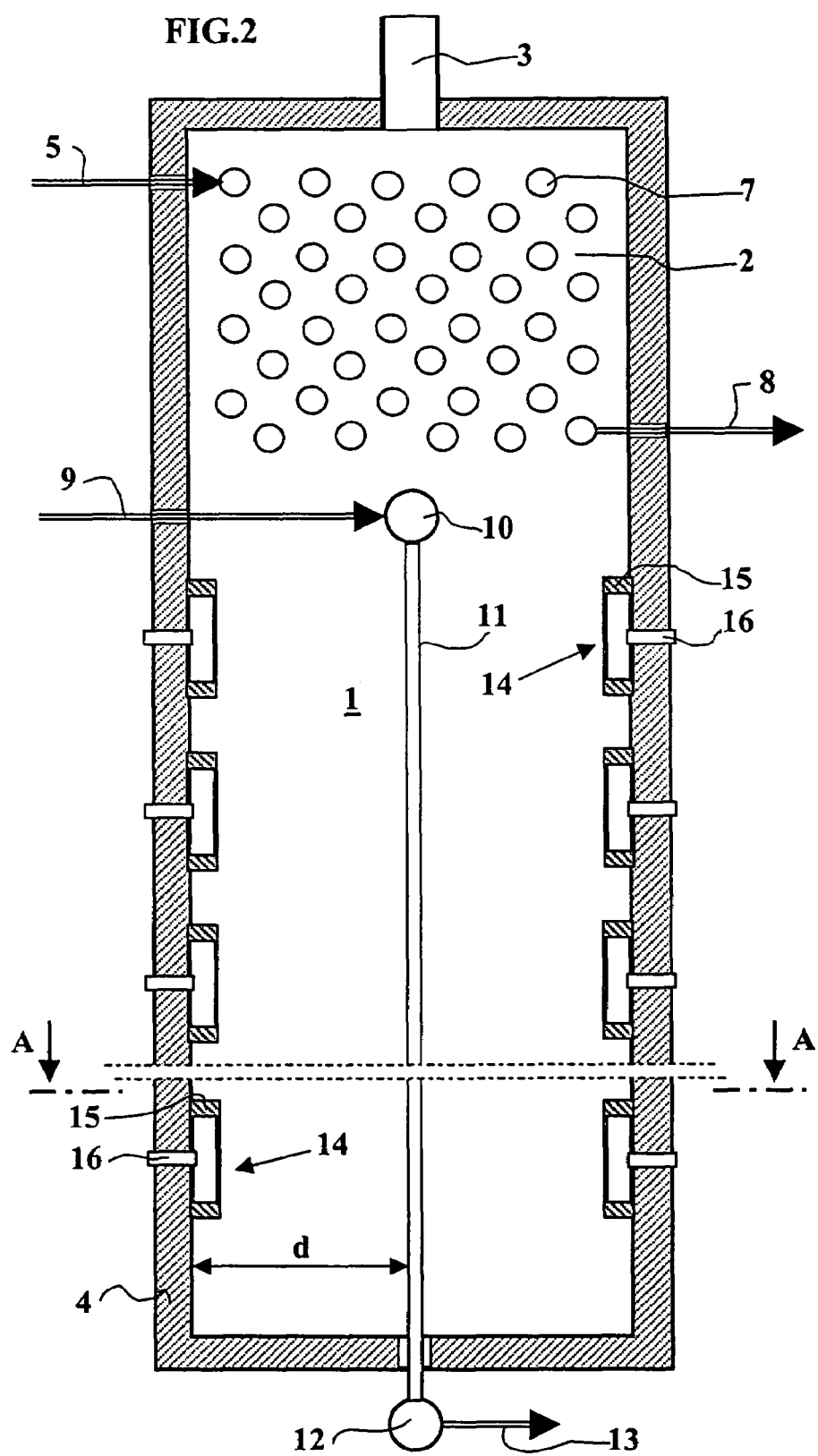
FIG. 2 is a cutaway view of a furnace according to the invention that is equipped with radiant burners that are placed along its lateral faces.

FIG. 2 corresponds to the case of a steam-cracking furnace that uses an essentially vertical tube bundle that is placed along a single plane (11) that is placed essentially at the center of the radiation chamber. The fuel that is used is a gaseous fuel that can be either natural gas or another gaseous fuel such as, for example, "diesel fuel," i.e., a gaseous fuel by-product of refineries or petrochemical sites.

This furnace comprises a radiation zone (1), a convection zone (2) and a pipe for evacuating combustion gases (3) to the chimney. The furnace has an approximately parallelepipedic form. Walls (4) are preferably smooth and covered by insulating materials. The feedstock that is to be treated arrives via a line (5) and supplies bundle (7) that is located in a convection zone.

The feedstock is thus preheated by the combustion smoke that is obtained from the radiation zone and that leaves the convection zone via line (8) to enter into a radiation zone via line (9), which supplies a supply tank (10). This supply tank is necessary to the extent that the passage from the convection bundle to the radiation beam is generally accompanied by a multiplication of the number of passes.

Tank (10) makes possible an equal supply of different tubes (11) that constitute the radiation beam. The products of the steam-cracking reaction that are obtained from different tubes (11) are collected in tube (12) and directed toward the zone of downstream treatments, comprising at least one cooling zone and one fractionation zone, via line (13).

Tubes (11) can be more or less spaced from one another, and the distance separating two adjacent parallel tubes will generally be between 1 and 100 cm and preferably between 5 and 20 cm. The heating of tubes (11) is assured by a group of catalytic radiant burners according to the invention (14).

These burners (14) are placed along several horizontal levels, whereby each level is partially or totally recovered by the burners. The number of levels is between 2 and 30, and preferably between 4 and 8.

Burners (14) are hooked to walls (4) by attachment means (15). Each burner is supplied with air and with fuel by lines (16).

Figure 3:
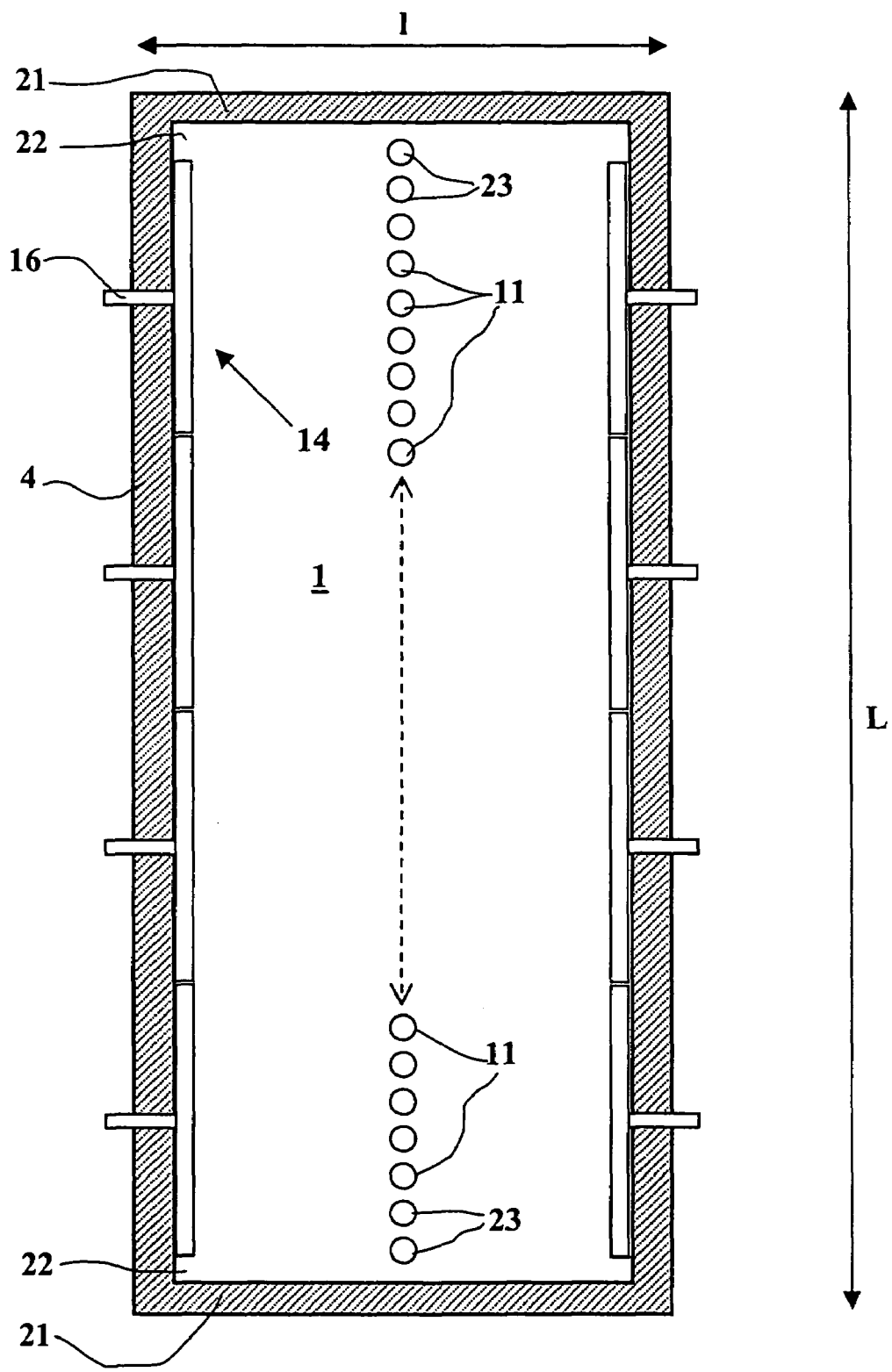
FIG. 3 represents the same furnace according to the invention in a top view.

FIG. 3 is a cutaway view of the radiation zone of the furnace of FIG. 2 along plane AA'. This radiation zone has a parallelepipedic shape, elongated according to a larger dimension called length, whereby the smallest dimension is the width. The ratio of length to width is preferably greater than 4.

Catalytic radiant burners (14) are preferably placed on the two opposite faces (4) that correspond to the length of the radiation zone, but in some cases, it is possible to use burners on the opposite faces (21) that correspond to the width of the radiation zone.

Burners (14), or more specifically the corresponding parallelepipedic boxes, as it will be explained in detail later, are preferably placed in a congruous manner, so as to constitute a continuous heating zone, called a band below, and corresponding to a horizontal level, over almost all of the face (4). In this particular geometry, ends (22) of faces (4) generally will not be covered by the parallelepipedic boxes so as to take into account edge effects, and to prevent tubes (23) that are located on the ends of tube bundle (11) from being subjected to heat-radiating flows that are more intense than the other tubes.

FIG. 4 is a front view of tube bundle (11) that is placed in radiation zone (1). Radiant catalytic burners (14) are placed along the horizontal bands that form a radiant catalytic panel (31), whereby the bands may or may not be spaced regularly along the height of wall (4). This is the arrangement of these horizontal bands (or radiant panels); i.e., the number and spacing of said bands, as well as the number of radiant burners that each band contains that will make it possible to define a temperature profile that is determined along tubes (11).

FIG. 4 represents 6 regularly spaced horizontal bands, but this particular, purely illustrative, arrangement is in no case a limitation.

FIG. 5 is an embodiment of a radiant catalytic burner according to the invention.

The burner consists of a parallelepipedic box (30) that is attached to wall (4) by attachment means (15a and 15b). Radiant catalytic panel (31) constitutes the face of the box opposite to wall (4). Radiant catalytic panel (31) can be made of ceramic or metal and comes in the form of a monolith, or is made of fiber or else a frit, or in any form that defines a porosity, ordered or irregular, of between 0.1 and 0.95, and preferably between 0.3 and 0.8.

Panel (31) is covered partially or totally by catalyst, whereby the catalyst is selected from among those that are well known to one skilled in the art, such as the precious metals or transition metal oxides. By way of example, it is possible to select a combustion catalyst as described in Examples 1, 6, 7 and 8 of European Patent EP 0 689 870, which describes catalysts of type $La_x, Mg_y, Mn_z, Al_t, O_u$ or $Ba_x, Mn_y, Mg_z, Al_t$ or $O_u$. The invention is not linked to the particular nature of the selected combustion catalyst.

It is also very important to note that the location of the catalytic zone inside radiant panel (31) may be entirely inside the radiant panel (radiant mode) or located on its outside surface of this panel (blue flame mode). The location of the catalytic zone will be determined specifically based on the desired coupling between heat production and transmission of the heat to the outside of the porous environment.

In the context of steam-cracking furnaces, the preferred mode will be the "radiant" mode, whereby the combustion takes place inside the radiant panel. In this case, the outside face of said panel, i.e., the face opposite tube bundle (11), will be a warm, heat-radiating surface but does not exhibit flame, which will make possible a great homogeneity of heating of the panel, and, in combination with an adequate arrangement of said panels, will lead to a determined temperature profile of the tubes of bundle (11).

Walls (32) of box (30), with the exception of porous wall (31), that correspond to the radiant panel are covered by elements (33) of insulating material that will limit the elevation of temperature of said walls (32) so as to remove any risk of spontaneous inflammation of the air/fuel mixture upstream from its contact with the catalytic zone.

Elements (33) are also used in the attachment of radiant panel (31) to box (30) in combination with blocking lug (34) as indicated in Figure (5).

Supplies of air and fuel from box (30) are assured by concentric lines (36) and (37) that form the whole (16) respectively for the combustion air and fuel gas. Preferably, line (37) will be closed at its downstream end and will comprise lateral orifices (38) so that the fuel gas will be introduced radially into intake pipe (36) of combustion air.

The air/fuel mixture will thus be facilitated and obstacle (39), which can be a simple deflecting plate, as shown in Figure (5), will be placed downstream and close to the end of pipe (36) so as to create a disturbance in the flow of the air-fuel pre-mixture at the outlet of pipe (36).

It is actually of first importance in the context of the steam-cracking furnaces to penetrate the air-fuel mixture inside catalytic radiant panel (31) in a state that is as homogeneous as possible so as to produce the combustion at the catalytic zone and not upstream or downstream from said zone.

The ignition is done by means of an ignition device (40), for example of the "candle" type, whereby said device is supplied electrically by an ignition circuit (41), connected to the outside via a line (42) using a connection (43).

The ignition candle is used to combust the air-fuel mixture on the surface of catalytic radiant panel (31) where a flame is first formed that disappears gradually as the radiant panel rises in temperature until the entire combustion moves to the inside of the radiant panel and is stabilized in the catalytic zone.

Attachment elements (44a and 44b), in combination with elements (33), can be arranged so as to allow the lateral sliding of box (30) along the horizontal-band to which it belongs.

This operation may be required by, for example, a mechanical rupture of the radiant panel detected by a pressure drop in the air supply circuit and optionally may be conducted with the furnace remaining in operation.

The safety of the catalytic radiant burner may be assured by certain means that are not shown in FIG. 5, such as, for example, a non-catalytic element that is placed upstream from the catalytic element inside or outside radiant panel (31) so as to avoid any risk of inflammation of box (30) in the case where the inside face (i.e., the upstream face in the direction of flow of the fluids) of the catalytic element would heat up abnormally. Thermocouples can also be implanted in the catalytic zone of radiant panel (31) so as to be assured of its normal operation.

The advantages that are obtained by the radiant panel according to the invention can be summarized by the following points:

1) All of the heat-radiating exchange bundle tubes are subjected to the same thermal profile. They therefore have the same productivity, and they undergo the same amount of wear.
2) Whereby the radiant panels are grouped by horizontal bands such that they are described in the text, the tube bundle receives a perfectly defined heat flow over the height portion corresponding to a given horizontal band such that it is possible to modulate the heat flow according to the different levels of horizontal bands and thus to manage to impose a temperature profile that is determined along vertical tubes of the heat-radiating bundle. This possibility already exists in the configuration of furnaces that use traditional burners that are also distributed along several horizontal levels, but the existence of a flame that is associated with each burner makes the heating zone much more inaccurate primarily if the combustion gas circulation currents inside the chamber come to disturb the shape of the flame. Ultimately, the temperature profile along the heat-radiating tube bundle will be much more inadequate and random over time than the one that is obtained within the scope of this invention.
3) The compactness of the furnace can be increased. It is actually well known to one skilled in the art that in a steam-cracking furnace that uses traditional flame burners, it is necessary to respect safety distances between certain zones of the flame and the tubes that are exposed to the radiation to avoid the formation of hot points and the corrosion of the tubes. With the radiant panels according to the invention, it is possible to reduce these safety distances in a proportion of 25 to 80%, and more specifically 40 to 70%.
4) And primarily, the NOx content specification in the smoke that from now on in certain countries is 10 mg/Nm*3 can be reached using the possibility of operating in radiant mode, even with high thermal flows that can reach 400 kW/m*2 and even more, by limiting in particular this power (and therefore the emitted NOx) by means of panels that occupy a large fraction of the radiant walls.

Finally, it should be emphasized that all of the advantages inherent to this invention are found when the heat-radiating bundle tubes are partially or completely filled with catalyst, such that the latter encounters synthesis gas production in the furnaces by steam reforming. In this type of furnace, the invention will contribute to protecting the catalyst that is contained inside heat-radiating bundle tubes from any risk of hot points and will therefore decrease the aging rate of the catalyst.

COMPARATIVE EXAMPLE

The following comparative example is intended to illustrate the advantage that is obtained by a finer monitoring of the temperature profile in the case of a naphtha steam-cracking furnace.

A furnace that is equipped with radiant panels is used whose heating power will be adjusted to simulate the operation of a traditional furnace and a furnace according to the invention. To simulate the operation of a current standard furnace that corresponds to the state of the art and a furnace according to the invention, a heat-radiating exchange tube of 7 meters in length and 2.5 cm of inside diameter placed approximately in the center of the radiation zone was used. The circulation of the feedstock in the tube takes place from bottom to top.

The furnace that is used in this experiment comprises three horizontal heating zones, uniformly spaced and of identical height, placed along lateral walls as indicated in FIG. 3. Each heating zone has a height of 2.3 m and consists of a rectangular set of 6 radiant panels of 0.1 m of width by 0.5 m of height placed one above the other, three by three on each side of the heat-radiating exchange tube that forms an almost continuous heating surface along an essentially vertical axis.

The nominal power of each radiant panel is 10 kW.

In the two cases, the feedstock flow rate is adjusted to obtain a dwell time in the heat-radiating exchange tube of 0.2 s, and the mass ratio of water vapor to feedstock is equal to 0.6.

The temperature of the mixture of feedstock and water vapor at the inlet of the furnace is 500° C. In the first case that corresponds to the operation of a standard furnace, the three heating zone are at the same temperature, which makes it possible to simulate the operation of a traditional furnace. Actually, in this type of furnace, the thermal exchanges are done via smoke and lateral walls of the furnace that support the burners, which are essentially at a constant temperature, taking into account heat-radiating exchanges in the radiation chamber.

A temperature profile is then established along the essentially convex exchange tube with transferred flows that are weaker at the chamber outlet (i.e., at the upper portion of the tube) than at the inlet of the chamber (i.e., at the lower portion of the exchange tube).

For a temperature of radiant panels of 950° C., identical to the three heating zones, an outlet temperature of the reaction tube of 860° C. and an ethylene yield of 29% by weight are obtained. The yield of propylene, second highly enrichable product, is 10.5% by weight.

In the second case that corresponds to an operation of the furnace according to the invention, the heating power is varied so as to obtain an almost linear temperature profile along the reaction tube.

The heating power of the lower radiant panel (corresponding to the lower portion of the reaction tube) is reduced so as to flatten the temperature profile in this zone.

The temperature of the intermediate radiant panel is kept essentially identical to that of the preceding example, while the temperature of the higher radiant panel (corresponding to the upper portion of the reaction tube) is increased by about 40° C. relative to the temperature of the preceding case, this by an increase in the heating power of this higher radiant panel.

The calculations that are performed with the CRACKSIM software indicate that the temperature profile that is obtained is close to a linear profile.

The temperature of the furnace outlet is established at 890° C. for an ethylene yield that is identical to that of the preceding case of 29% by weight. In contrast, the propylene yield is for the most part improved to reach 12.4% by weight, or a gain of 1.9 points in iso ethylene yield.

The gain in the operation of a steam-cracking furnace with a capacity of 100,000 tons/year of ethylene would therefore be 6500 tons of propylene per year, which is entirely indicative.

The increase in the propylene yield to iso ethylene yield is therefore very considerable and corresponds to an economic gain of 3.3 million euros per year.

The invention claimed is:

1. A process for heat treatment of a hydrocarbon feedstock in a furnace that comprises at least one parallelepipedic radiation chamber with two opposite radiant walls supporting catalytic burners comprising parallelepipedic panels each comprising one face along one radiant wall and an opposite face formed by a porous panel parallel to said one radiant wall and emitting heat toward at least one essentially vertical exchange tube bundle bundle, the process comprising: providing at least one essentially vertical exchange tube bundle inside of which circulates the hydrocarbon feedstock to be treated, equipping said radiant walls with catalytic radiant burners with porous panels that are typically used in the form of essentially horizontal or optionally vertical bands that are distributed over several levels in the vertical direction, or respectively in the horizontal direction, generating with the catalytic radiant burners a mean temperature Tm of the radiant walls of between 900° C. and 1300° C., having a ratio R of the cumulative surface of the porous panels to the cumulative surface of the radiant walls of at least 0.3 and selecting the ratio R high enough and mean temperature Tm low enough that the NOx level in the smoke at the outlet of the furnace is at most 100 mg/NM$^3$.

2. A process according to claim 1, wherein ratio R of the cumulative surface area of the porous panels to the cumulative surface area of the radiant walls is at least 0.3 and wherein ratio R is high enough, and mean temperature Tm is low enough, for the NOx level in the smoke at the furnace outlet to be at most 10 mg/NM$^3$.

3. A process according to claim 1, wherein Tm is in a range of 950° C. and 1250° C., and R is in a range of 0.5 and 1.

4. A process according to claim 1, wherein each radiant burner comprises a parallelepipedic box that has one of its faces placed against one of the lateral walls of the furnace, whereby the face opposite to said one faces comprises a porous panel having an inside face communicating with a fuel supply chamber, the outside radiative face transferring heat therein to the tube bundle essentially by radiation.

5. A process according to claim 4, wherein the porous panel exhibits a pore size in a range of between 0.1 and 0.95.

6. A process according to claim 4, wherein the combustion of the air-fuel mixture that is used in the supply of catalytic radiant burners takes place in a catalytic zone that is located inside the porous panel, according to a so-called radiant combustion mode.

7. A process according to claim 4, wherein the combustion of the air-fuel mixture that is used in the supply of catalytic radiant burners takes place over the outside surface of the porous panel according to a so-called blue flame method.

8. A process according to claim 1, wherein at each catalytic radiant burner, the radiant combustion mode is used in a heat flow range of 10 to 600 kW/square meter.

9. A process according to claim 1, comprising steam-cracking hydrocarbons for the production of ethylene and propylene.

10. A process according to claim 1, comprising steam reforming of hydrocarbons that have essentially less than 12 carbon atoms for the production of synthesis gas.

11. A process according to claim 4, wherein the porous panel exhibits a pore size in a range of 0.3 and 0.8.

12. A process according to claim 1, wherein at each catalytic radiant burner, the radiant combustion mode is used in a heat flow range of 100 to 300 kW/square meter.

13. A process according to claim 2, comprising steam-cracking hydrocarbons for the production of ethylene and propylene.

14. A process according to claim 3, comprising steam-cracking hydrocarbons for the production of ethylene and propylene.

15. A process according to claim 4, comprising steam-cracking hydrocarbons for the production of ethylene and propylene.

16. A process according to claim 5, comprising steam-cracking hydrocarbons for the production of ethylene and propylene.

17. A process according to claim 6, comprising steam-cracking hydrocarbons for the production of ethylene and propylene.

18. A process according to claim 7, comprising steam-cracking hydrocarbons for the production of ethylene and propylene.

19. A process according to claim 8, comprising steam-cracking hydrocarbons for the production of ethylene and propylene.

20. A process according to claim 1 wherein R is in a range of 0.7 to 0.95.

* * * * *

UNITED STATES PATENT AND TRADEMARK OFFICE
CERTIFICATE OF CORRECTION

PATENT NO.        : 7,288,691 B2
APPLICATION NO. : 10/764584
DATED             : October 30, 2007
INVENTOR(S)       : Gerard Martin et al.

It is certified that error appears in the above-identified patent and that said Letters Patent is hereby corrected as shown below:

On the Title page and Col. 1, Line 2-3, Title: lines 2 – 3, reads "BY FURNACE" should read -- BY A FURNACE --
Column 12, line 28, reads "tube bundle bundle," should read -- tube bundle, --

Signed and Sealed this

Twenty-ninth Day of April, 2008

JON W. DUDAS
*Director of the United States Patent and Trademark Office*